(12) United States Patent
Amacker

(10) Patent No.: US 8,879,785 B1
(45) Date of Patent: Nov. 4, 2014

(54) VIRTUAL POSTAGE BASED ON IMAGE RECOGNITION

(75) Inventor: Matthew Warren Amacker, Santa Clara, CA (US)

(73) Assignee: A9.com, Inc., Palo Alto, CA (US)

( * ) Notice: Subject to any disclaimer, the term of this patent is extended or adjusted under 35 U.S.C. 154(b) by 225 days.

(21) Appl. No.: 13/526,188

(22) Filed: Jun. 18, 2012

(51) Int. Cl.
*G06K 9/00* (2006.01)

(52) U.S. Cl.
USPC .......................................... 382/101

(58) Field of Classification Search
None
See application file for complete search history.

(56) References Cited

U.S. PATENT DOCUMENTS

2010/0100233 A1* 4/2010 Lu .................. 700/226

2011/0145107 A1* 6/2011 Greco ................... 705/27.2

\* cited by examiner

*Primary Examiner* — Nirav G Patel
(74) *Attorney, Agent, or Firm* — Novak Druce Connolly Bove + Quigg LLP

(57) ABSTRACT

A number of approaches for using a camera or other device to capture an image of an arbitrary signature, drawing and/or other scribble rendered on a package and utilizing the captured image as electronic postage for shipping the package to the recipient destination. A sender wishing to send a package handwrites a signature or other scribble directly onto the package that is to be shipped. A mobile device (e.g., smartphone) can be used to capture an image of the scribble and perform image recognition to determine whether the captured image contains sufficient features to be distinct from other images stored in a database. If the image is sufficiently distinct, the image can be accepted as electronic postage for the package. When the package is picked up, the delivery person scans the scribble and matches it to the image on file to determine the recipient address and other shipping information.

21 Claims, 8 Drawing Sheets

VIRTUAL POSTAGE BASED ON IMAGE RECOGNITION

BACKGROUND

Mail or postage services utilize systems for transporting letters or other objects from one location to another. Postal carriers can be either government based (e.g., U.S. Postal Service) or private (e.g., FedEx Corporation, United Parcel Service). In conventional postal systems, a label is typically attached to a package or envelope for indicating the recipient, delivery address, sender and other pertinent information. The label typically contains a barcode or some other machine readable information that can be scanned by an optical scanner or other device. There are many manufacturers and providers of postage labels. They typically obtain and store credit card information, sender and recipient information and weight of the package. One of the shortcomings of conventional postage labels is the need for additional equipment necessary to utilize them. For example, a shipping company or other entity usually needs to employ an infrastructure of printers, adhesives, paper, scanners and other tools to employ the use of labels. This equipment can often be expensive, cumbersome and in some respects inefficient.

BRIEF DESCRIPTION OF THE DRAWINGS

Various embodiments in accordance with the present disclosure will be described with reference to the drawings, in which.

DETAILED DESCRIPTION

Figure 1A:
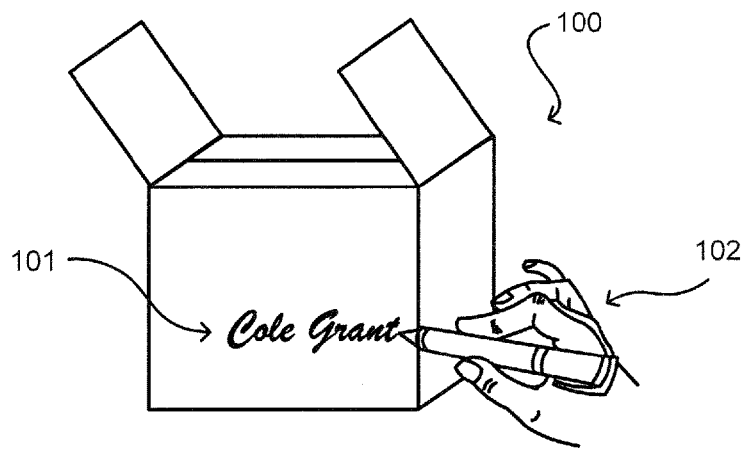
FIG. 1A illustrates an example of a shipping package that uses a sender's signature as virtual postage, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for providing postage and/or labeling used to deliver mail and other tangible objects. In particular, the various embodiments provide approaches for using a camera or other device to capture an image of a unique pattern, such as an arbitrary signature, drawing and/or other scribble rendered on a package. The captured image can be analyzed to determine the unique pattern, information for which can be stored and associated with the package, a user, a recipient, an address, an account, or other such information. The unique pattern can also be proof of payment, and thus can function like electronic postage for shipping the package to the recipient destination, as any party receiving or transferring the package can capture an image of the unique pattern and verify the shipping information, postage, and other such data for the package.

In accordance with various embodiments, a user wishing to ship a package (i.e. sender) fills a box with a tangible item to ship, seals it up, and then signs their name (or other scribble) onto the box's surface. The instructions for the user to perform these steps can be provided by an application installed on the mobile device (e.g., a smartphone application). In accordance with an embodiment, the signature or scribble can be provided without any printer or other label equipment. The scribble can be hand drawn directly onto the package or even on top of other labels (e.g., prior shipping labels).

In accordance with an embodiment, the user then uses their mobile device (e.g., smartphone, tablet) to scan the scribble on the package. For example, the scanning can be performed by using the digital camera of the mobile phone to capture an image of the scribble. The image is then analyzed in order to verify that the scribble contains enough distinguishing features to make it distinct from other images in a database (e.g., other scribbles being used for postage). If the image is verified as being distinct enough, the scribble can be accepted as electronic or "virtual" postage.

In various embodiments, when the sender scans the signature (or other scribble), a search is performed across any and/or all other current postage signature and box combinations. For example, each combination may include the color of the shipping box, any labels the signature may be drawn on, print color, pattern, and the like. If the combination is distinct enough from all other signature combinations, the scrawl can be accepted as a possible postage-signature. In accordance with an embodiment, once accepted, the postage is primed for pick up, meaning that if the package is picked up, the postage will be charged and the image of the signature is placed in the visual match database for all subsequent image matches. In addition, once the postage is primed, the delivery person is notified that there is a potential package for pickup and they are provided the image the sender captured of the package and the signature. In one embodiment, the location of the package can be determined based at least in part on the geographical position information of the mobile device that the sender used to capture the image.

In accordance with an embodiment, once the scribble has been scanned, the sender may be asked for approximate weight and dimensions of the box as well as location for delivery (e.g., recipient address). Alternatively, the delivery location maybe automatically determined by the application on the mobile device. For example, if the user has clicked on "Return Merchandise" link of an online merchant mobile application, the application may automatically provide the recipient address of the merchant. Alternatively, the user may select an address from a Contacts list on their mobile phone or retrieve it from some other location. In accordance with an embodiment, the weight, dimension and destination information are used to calculate the postage (e.g., charges) for shipping the package. The sender can then approve the shipping charges and leave the package in a designated location for pick up (e.g., on the porch).

In accordance with an embodiment, once the scribble has been accepted as postage, the system may notify the delivery carrier that the package is ready to be picked up. The delivery person comes to pick up the package to be mailed and scans the scribble on the package with their mobile computing device (e.g., mobile phone, tablet, electronic goggles). The delivery carrier can scan the package around the signature area, match the postage, and take the package for delivery. When looking for the package and/or scribble, the delivery carrier is aided by the image of the package and scribble captured by the sender and provided to the carrier.

In accordance with an embodiment, visual recognition is performed to match the scribble scanned by the delivery person to the image that was provided by the sender. In various embodiments, visual recognition techniques may take a picture and match it against a known database of pictures. When this recognition attempt is performed, the system can apply one or more filters or transformations of the picture that will accommodate for, among many differences, light differences, bending and blurring. There is a number of visual and image recognition techniques well known in the art, and any of such techniques can be utilized within the scope of the various embodiments described herein.

In accordance with an embodiment, once the scanned package is matched to the image that has been accepted as postage, the system can determine the recipient address, postage charges, sender, as well as any other pertinent shipping information. The delivery person may then verify that the sender and recipient information are correct and the approximate dimensions and takes the package for delivery.

In accordance with an embodiment, when the delivery carrier matches the scribble for postage, the picture taken by the delivery carrier can also be added to the accumulation of images of the image signature. In some cases, the delivery person's image can be even more useful than the sender's because the camera used by the delivery carrier may be a standard one used by all other parts of the shipping chain and therefore may provide better matching characteristics.

In this manner, the various embodiments described herein uses image recognition technology to turn simple hand-done scrawls on a box into postage. This may enable creating shipping postage with a pen and a phone, rather than using printers, paper, computers and other equipment needed.

It should be noted that throughout this disclosure, the terms scribble, scrawl, drawing, pattern and signature are often used interchangeably and are intended to cover any writing, picture or symbol that can be handwritten, drawn or otherwise rendered onto a box, package or item by a user using a writing instrument or other equipment.

FIG. 1A illustrates an example of a shipping package 100 that uses a sender's signature as virtual postage, in accordance with various embodiments. In the illustrated embodiment, the user can hand write his or her signature 101 using a pen, marker, or any other writing utensil 102 onto the box or other package that will be used to ship the item. The signature can be written directly onto the box or onto a label or other material that has been applied to the box. In accordance with an embodiment, the various characteristics of the canvas are combined with the unique features of the scribble to make the postage more distinct. For example, the color or other distinguishing marks on the box, labels attached to the box, or any other unique attributes can be combined with the signature 101 to form a virtual postage signature that will be used to ship the package.

Figure 1B:
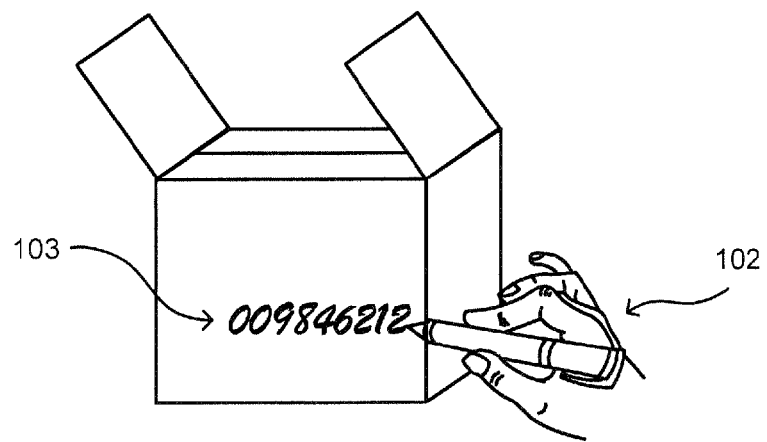
FIG. 1B illustrates an alternative example of a shipping package that uses one or more numbers written by the sender as virtual postage, in accordance with various embodiments.

FIG. 1B illustrates an alternative example of a shipping package that uses one or more numbers written by the sender as virtual postage, in accordance with various embodiments. In this illustrated embodiment, the user handwrites a sequence of numbers 103 using a writing instrument 102 onto the package used for shipping one or more items. In accordance with one embodiment, the sequence of numbers 103 is suggested by the application installed on the mobile device. Alternatively, the sequence of numbers can be randomly selected by the user (e.g., sender). In various embodiments, the numbers may or may not be actually recognized as numbers. For example, in some embodiments, the numbers may serve as merely another form of random scribble; while in other embodiments, a computing device can use text recognition techniques to decipher the actual numbers that were handwritten. As with the signature previously described, the numbers can also be handwritten directly onto the box or any label attached thereon.

Figure 1C:
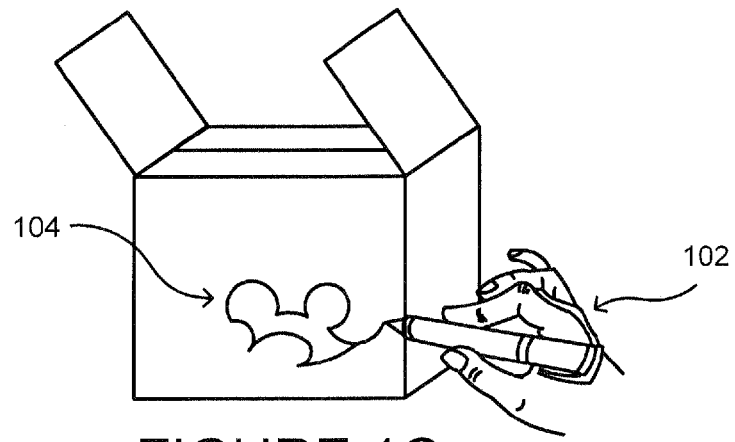
FIG. 1C illustrates an alternative example of a shipping package that uses an arbitrary scrawl as virtual postage, in accordance with various embodiments.

FIG. 1C illustrates an alternative example of a shipping package that uses an arbitrary scrawl as virtual postage, in accordance with various embodiments. In the illustrated embodiment, the user handwrites an arbitrary scrawl 104 using a pen or other writing instrument 102. Alternatively, the user may utilize a stamp or any other instrument to render a distinct scribble to the box or package. As before, the scribble can be drawn directly onto the box or onto any label or other material applied to the box.

Figure 2:
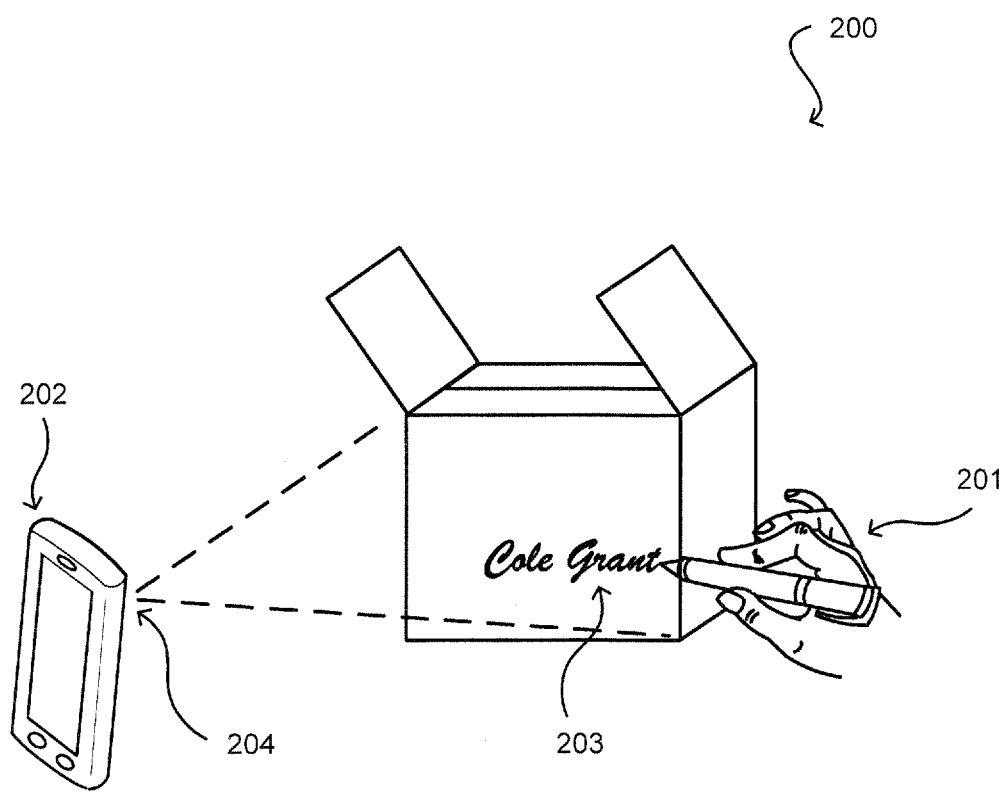
FIG. 2 illustrates an example of a mobile device being used to scan a signature handwritten onto the package, in accordance with various embodiments.

FIG. 2 illustrates an example 200 of a mobile device being used to scan a signature handwritten onto the package, in accordance with various embodiments. In the illustrated embodiment, a mobile device 202 (e.g., mobile phone, PDA, tablet) includes a digital camera 204 that can be used to capture an image of the package and the scribble 203 rendered thereon.

In accordance with an embodiment, the sender may use the mobile device to scan the signature 203 when shipping the package. By way of example, the user may open an application installed on the mobile phone 202. The application may be provided by the shipping and delivery company, online merchant, or any other entity. In one embodiment, when the user selects the "ship package" option, the application may instruct the user to scan a scribble (e.g., signature) on the box that will be used as virtual postage for the package. When the user points the digital camera 204 of the phone at the scribble 203, the application may analyze the scribble and determine whether the scribble contains sufficient features to make it distinct from all other scribbles being used for postage. In one embodiment, the application provides real time feedback to the user as the user is handwriting the scribble, informing the user when the scribble has reached a sufficient level of distinctness. For example, a color indicator can be displayed on the mobile phone that turns from red to yellow to green, indicating that the scribble is sufficiently distinct. Once the scribble is deemed sufficiently distinct, the mobile device can store the image of the scribble and transmit it to a remote location (e.g., to be stored in a shipping postage database).

Figure 3:
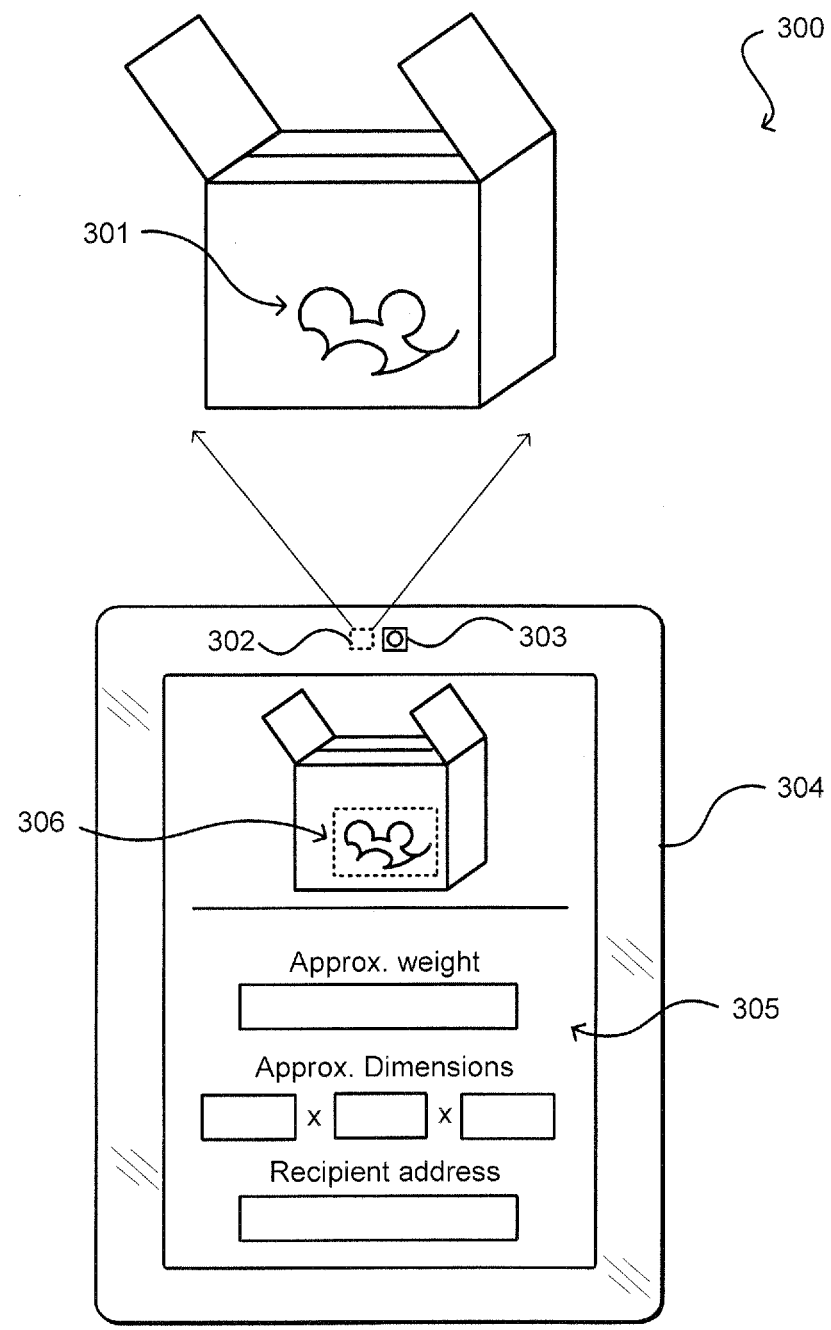
FIG. 3 illustrates an example of a mobile device with a graphical user interface used to capture an image of a scribble used as virtual postage, in accordance with various embodiments.

FIG. 3 illustrates an example 300 of a mobile device with a graphical user interface used to capture an image of a scribble used as virtual postage, in accordance with various embodiments. In the illustrated embodiment, the mobile device is a tablet computing device 304 including a front-facing digital camera 303 and a rear-facing digital camera 302 and a display screen 305 used to render information and/or images captured by the cameras.

In accordance with an embodiment, the rear-facing digital camera 302 is used to capture an image of the scribble 301 drawn on the package that is to be shipped. Alternatively, the front-facing camera 303 or any other device may be utilized. The image capture may be actuated by the user selecting an icon on the graphical user interface (GUI) 305 or may be automatically performed by the computing device 304. For example, the user may point the camera of the computing device at the scribble on the box and the software installed on the computing device may automatically begin analyzing the image 306 of the scribble to determine whether the scribble 301 is sufficiently distinct to be used as valid postage. In one embodiment, the image analysis is performed on the portion of the image showing the area 306 of the box that contains the scribble. The image analysis may include extracting all interesting points on the object in the image to provide a feature description of the object. The feature description can then be stored locally or remotely and later used to identify the scribble from other images. In some embodiments, the mobile device may inspect a database of images when determining whether the scribble is sufficiently distinct. The database may be remotely accessed over a network connection or locally stored on the device. In other embodiments, the software installed on the mobile device may specify a distinguishing feature threshold without comparing the scribble to any other scribbles in a database.

Once the device verifies that the scribble is sufficiently distinct, the device can store the image or a feature description of the image locally and/or transmit it to a remote location. In accordance with the illustrated embodiment, the user is then instructed to enter the pertinent shipping information for the package, including but not limited to the approximate or actual weight of the package, dimensions (length, height and width) of the package, recipient address and the like. In one embodiment, the sender's address can be automatically determined based on the geographical location of the mobile device and the sender may be given the option to modify the sender's address if he or she is mailing the package from another location. Similarly, in some embodiments, the recipient address may be automatically determined by the software on the mobile device, looked up using the contacts list on the mobile device, searched on the Internet, and the like.

In accordance with an embodiment, once the user enters the information, the mobile device can compute a postage fee for delivering the package. The postage fee can be based at least in part on the weight and size of the package and the destination address. Once the fee is computed, it can be displayed to the sender and the sender can confirm the postage fee to prime the package for pickup. In some embodiments, the user may be presented with an interface for entering payment information and submitting payment for the postage fee. In other embodiments, the payment may be automatically withdrawn from the user's account that is currently logged into by the application on the mobile phone.

Figure 4:
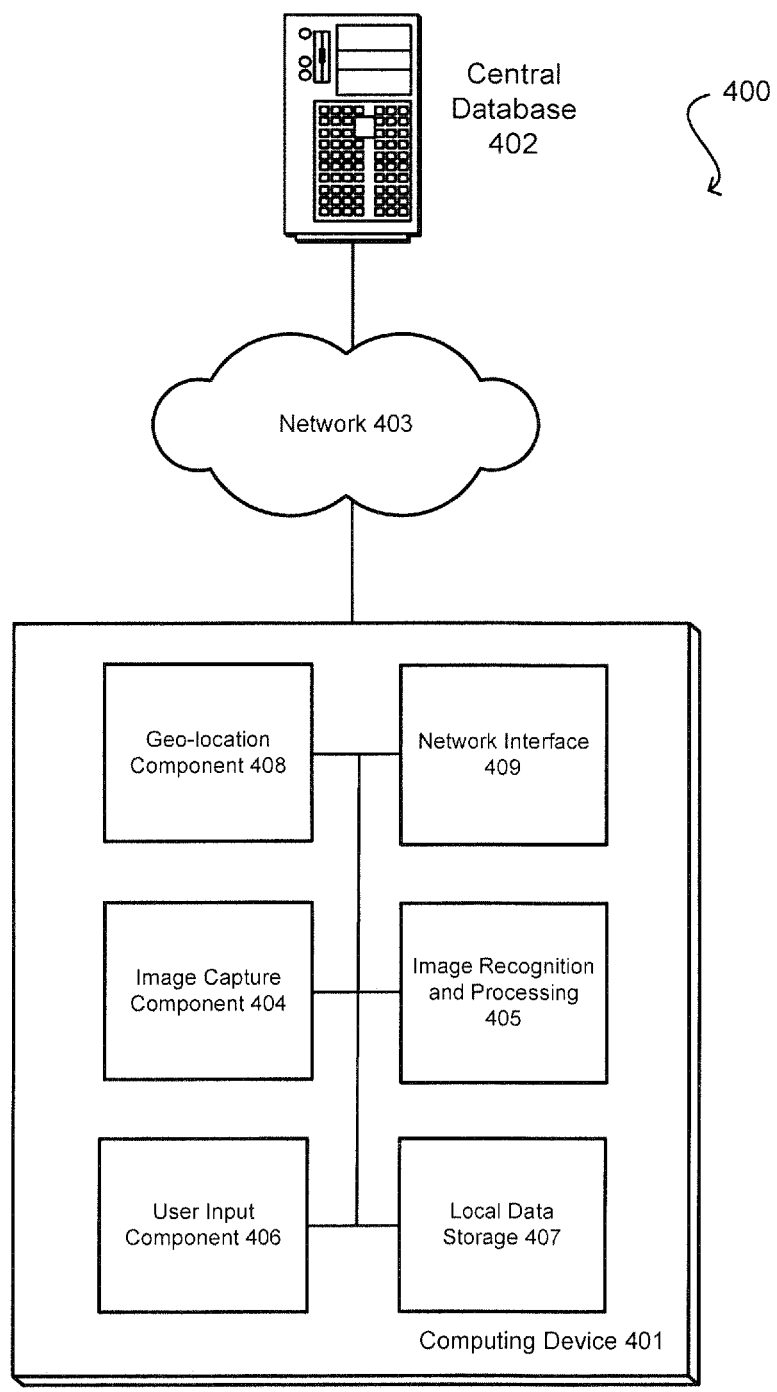
FIG. 4 illustrates an example of the various components of a computing device that can be used in accordance with various embodiments.

FIG. 4 illustrates an example 400 of the various components of a computing device that can be used in accordance with various embodiments. In the illustrated embodiment, the computing device 401 can include at least one user input component 406, local data storage 407, an image capture component 404, an image recognition and processing component 405, a network interface 409 and a geo-location component 408.

The user input component 406 can be any hardware, software or combination thereof that enables a user to enter or manipulate information using the mobile device. In various embodiments, the user input component can include a touch screen, one or more buttons, a keyboard, a mouse, three dimensional (3 D) gesture detection component or any other input device. The local data storage 407 can be any hardware, software or combination thereof that enables the mobile device to store data for later access. In various embodiments, the data storage can be embodied in random access memory (RAM), a solid state drive (SSD), a disk drive, read-only memory (ROM) or any other storage device. The image capture component 404 can be any hardware, software or combination thereof that enables the computing device to capture images and/or video. In various embodiments, the image capture component 404 can include a front or rear facing digital camera, a scanner, or any other device capable of obtaining a representation of an object.

In accordance with an embodiment, the computing device further includes an image recognition processing component 405 that is used to analyze the image of the scribble and verify that the image is distinct (i.e. unique) enough to serve as postage for the shipping package. Any number of image recognition techniques can be utilized to analyze the image. For example, one such technique is the scale-invariant feature transform (SIFT) which attempts to extract interesting points on the image to provide a feature description of the object (e.g., scribble). This description can then be used to identify the scribble when comparing the image to other images of other scribbles or signatures. It should be noted that SIFT is only one of the many visual recognition techniques that may be utilized within the scope of the embodiments described herein.

In accordance with an embodiment, the computing device 401 further includes a geographical location (geo-location) component 408. The geo-location component can be any hardware, software or combination thereof that enables the computing device to provide information about its current location. For example, the location information can be obtained from IP address, Wi-Fi and Bluetooth MAC address, radio-frequency identification (RFID), Wi-Fi connection location, device Global Positioning System (GPS) and/or GSM/CDMA cell identifiers.

In accordance with an embodiment, the computing device 401 further includes a network interface component 409. The network interface component can include any device that enables the computing device 401 to communicate with remote entities over a network. Some examples of the network interface 409 include network interface controllers (NICs), WiFi devices, Bluetooth devices, and the like. In accordance with an embodiment, the computing device 401 makes a connection over a network (e.g., Internet) 403 to a remote central database 402. As used throughout this disclosure, a network can be any wired or wireless network of devices that are capable of communicating with each other, including but not limited to the Internet or other Wide Area Networks (WANs), cellular networks, Local Area Networks (LANs), Storage Area Networks (SANS), Intranets, Extranets, and the like. The central database 402 may be maintained by the shipping company, online merchant or any other entity and may store all of the images (or other representations) of the various scribbles being used for postage. Once the sender's scribble is accepted as valid (e.g., distinct) postage, the computing device may transmit a representation (e.g., image, feature description) of the scribble to the central database 402, where it may be stored and used during the shipment of the package.

Figure 5:
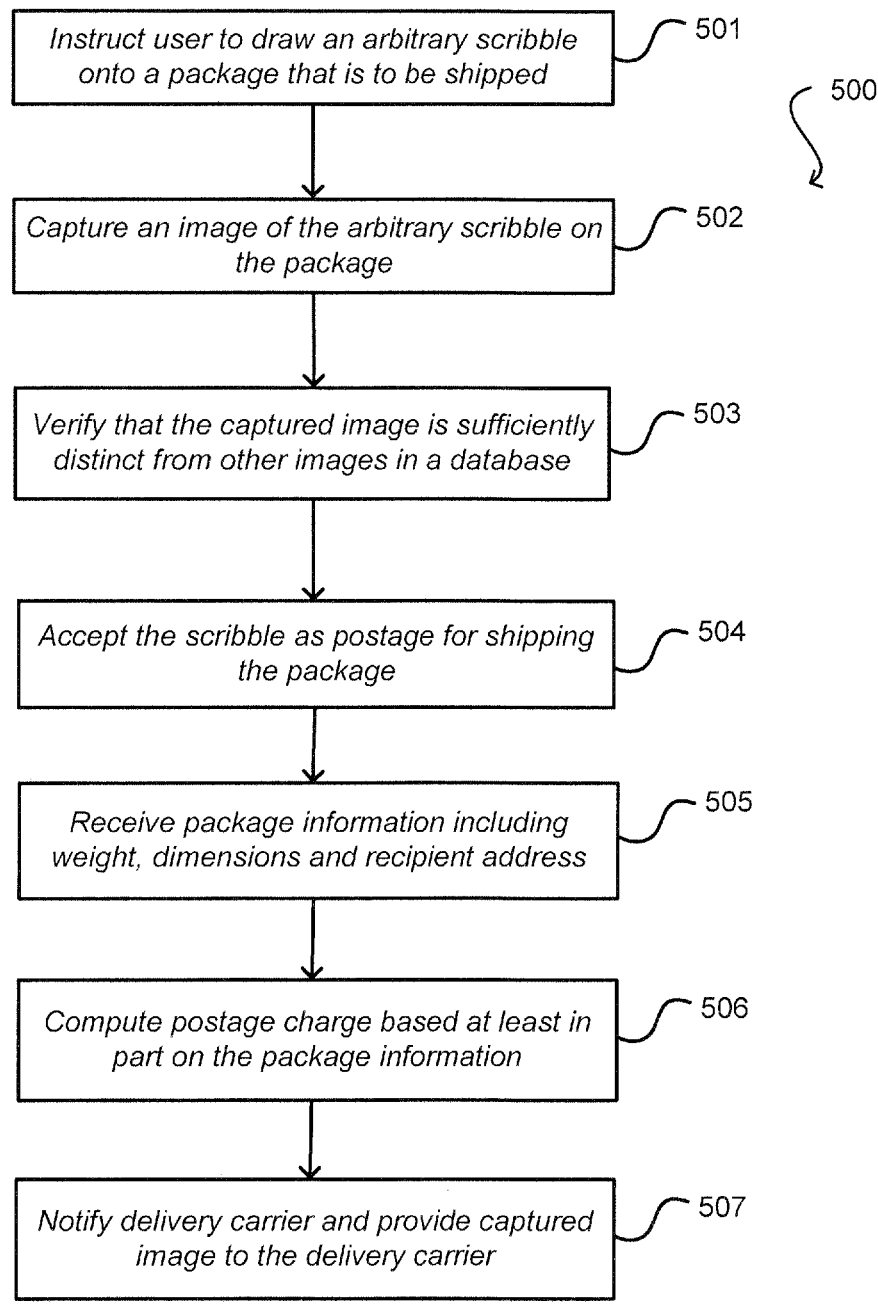
FIG. 5 illustrates an example of a process for providing a package for shipping in accordance with various embodiments.

FIG. 5 illustrates an example of a process 500 for providing a package for shipping in accordance with various embodiments. Although this figure may depict functional steps and/or operations in a particular sequence, the processes are not necessarily limited to the particular order or steps illustrated. One skilled in the art will appreciate that the various steps portrayed in this or other figures can be changed, rearranged, performed in parallel or adapted in various ways. Furthermore, it is to be understood that certain steps or sequences of steps can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In step 501, a user is instructed to draw a signature or other arbitrary scribble onto a package that is to be shipped. In accordance with an embodiment, the instructions can be provided by a mobile application or browser on a smartphone or other device. For example, a user may select the "return merchandise" option on an online merchant's application, and the application may bring up the instructions for the user to create a virtual postage for the package as described herein.

In step 502, the mobile device is used to capture an image of the arbitrary scribble on the package. In accordance with an embodiment, the digital camera of a mobile phone can be pointed at the scribble and the application can immediately begin analyzing the scribble. Alternatively, the mobile device may begin analyzing the scribble once the user has taken (snapped) the picture of the scribble. In step 503, once the scribble has been analyzed, the device can verify that the captured image contains a sufficient amount of distinguishing features to make it distinct from other images in the database. As previously mentioned, the uniqueness analysis may include providing real time feedback to the user as the user is scribbling the drawing onto the package. Moreover, the image analysis may take into account one or more distinguishing attributes of the package itself or any materials attached thereto (e.g., labels). If the combination of the scribble and the attributes is still not distinct enough, the sender would simply need to add a few more marks with their pen until the drawing is distinct.

In step 504, once the scribble or signature has been verified as being sufficiently unique, the scribble is accepted as valid postage to be used for shipping the package. In some embodiments, this may include transmitting a representation of the scribble (e.g., image) to a postage database maintained by the shipping company. In alternative embodiments, the device may transmit the representation at a later time, e.g., when the sender has confirmed the shipment.

In step 505, the mobile device may query the user for package shipping information, such as the weight, dimensions, and recipient address. In alternative embodiments, some or all of the shipping information may be obtained automatically, such as by the software installed on the mobile device. In step 506, the mobile device computes the postage fees based at least in part on the package shipping information. For example, the postage fee may be dependent on the weight of the box and the destination where it is to be delivered. Once the postage is computed, it can be displayed to the user, where the user may confirm the postage fees and shipment.

In step 507, once the user has confirmed the shipping of the package, the system stores the scribble as postage for the package and notifies the delivery carrier that the package is ready to be picked up. For example, once the user clicks onto the "confirm shipment" link, the mobile device transmits an image of the scribble to the shipping company's database. The shipping database system then stores the image along with the shipping information and automatically notifies a delivery person that the package is ready to be picked up at the designated location. In at least one embodiment, the captured image of the scribble is provided to the delivery carrier to aid the delivery person in identifying the package.

Figure 6:
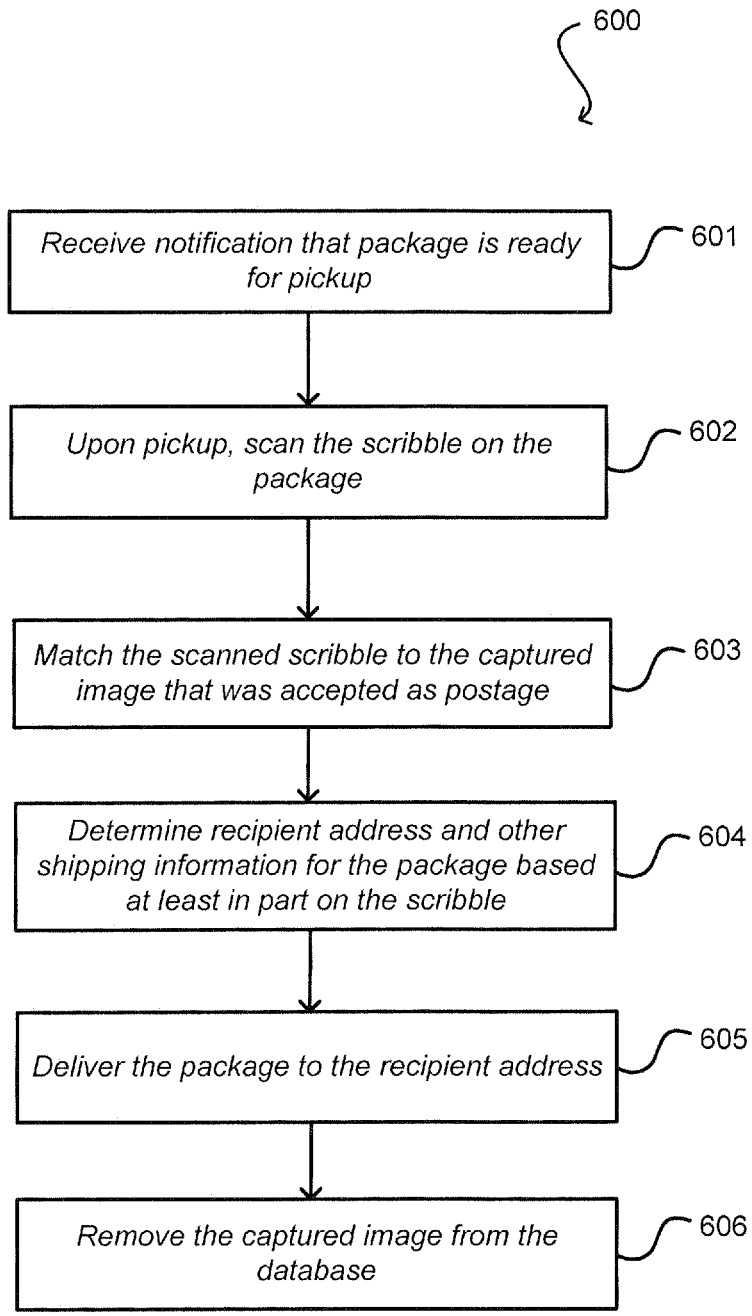
FIG. 6 illustrates an example process for picking up a package that has been associated with virtual postage, in accordance with various embodiments.

FIG. 6 illustrates an example process 600 for picking up a package that has been associated with virtual postage, in accordance with various embodiments. In step 601, the delivery carrier receives a notification from the mobile device that the package is ready for pickup. A delivery person may then be dispatched to pickup the package at the designated location. In at least one embodiment, the pickup location can be provided by the mobile device's location-based service.

In step 602, when the delivery person arrives and picks up the package, he or she may use their mobile device (e.g., mobile phone, tablet, scanner, goggles) to scan the scribble portion of the package. In at least one embodiment, the delivery person is aided by the image that was provided to them from the sender. In step 603, the system matches the scanned scribble to the stored representation of the scribble that was provided by the sender and accepted as postage. Visual search can work extremely well on images that are very similar. In this case, both the sender and the delivery person are capturing a picture of the same scribble with some potential variance(s) in lighting, angles and/or distance from the package. Thus, when the delivery person attempts the match, the system can use image recognition analysis to match the two images (or other representations).

In step 604, once the images have been matched, the system determines the recipient address and other pertinent shipping information for the package based at least in part on the scribble on the box. For example, if the central database stored the image of the scribble along with the shipping information, the match of the images would yield the appropriate recipient address for shipping the package.

In step 605, the delivery carrier delivers the package to the recipient address that was obtained based on the virtual postage. Additionally, once delivery has been completed, in step 606, the image from that signature could be purged from the image match, which will maintain a smaller database providing for more efficient image matching for future signatures.

Figure 7:
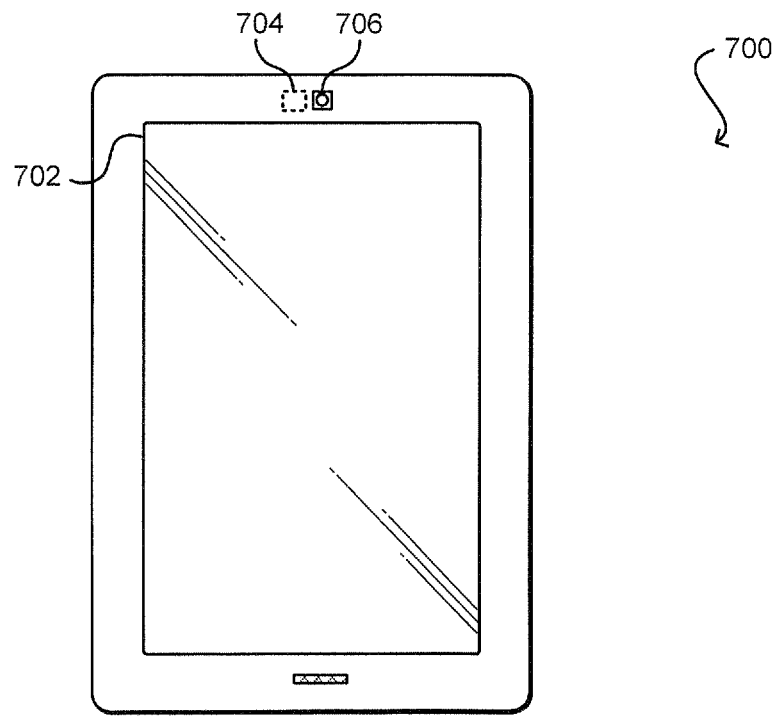
FIG. 7 illustrates an example computing device that can be used to perform one or more methods in accordance with various embodiments.

FIG. 7 illustrates an example computing device 700 that can be used to perform one or more methods in accordance with various embodiments. In this example, the device 700 has a conventional digital camera 706 on a same side of the device as a display element 702, enabling the device to capture image information about a user of the device during typical operation where the user is at least partially in front of the display element. In addition, the device 700 includes a rear-facing digital camera 704 that can be used to capture images of the scribble and/or package that is to be shipped. In at least some embodiments, the display element 702 can be a capacitive screen or other such element that is able to display various information and images to the user looking at the device and is also able to receive input from the user.

Figure 8:
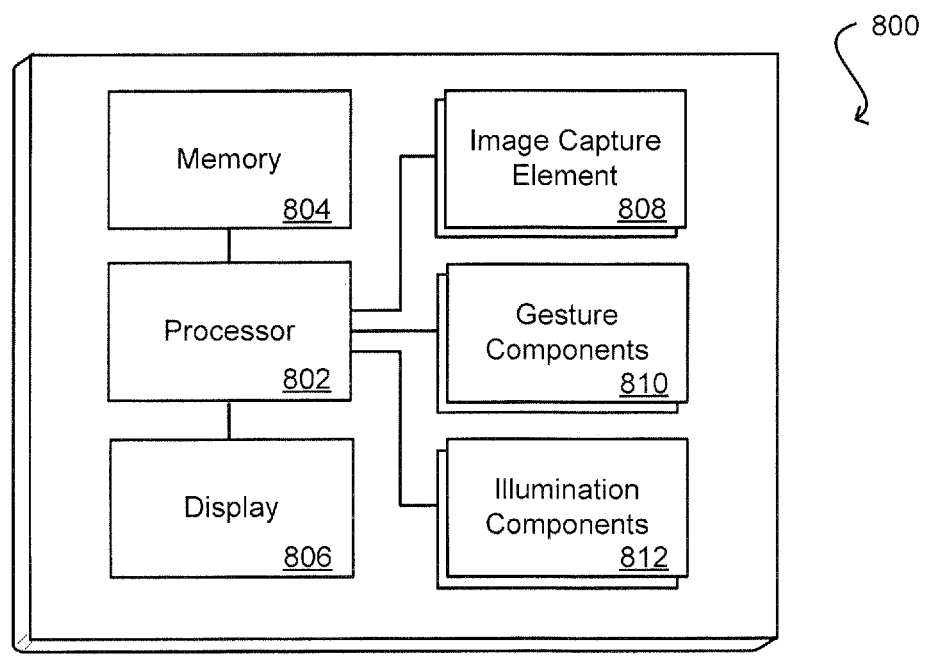
FIG. 8 illustrates an example set of basic components of a computing device, such as the device described with respect to FIG. 7.

In order to provide various functionality described herein, FIG. 8 illustrates an example set of basic components of a computing device 800, such as the device 700 described with respect to FIG. 7. In this example, the device includes at least one central processor 802 for executing instructions that can be stored in at least one memory device or element 804. As would be apparent to one of ordinary skill in the art, the device can include many types of memory, data storage or computer-readable storage media, such as a first data storage for program instructions for execution by the processor 802, the same or separate storage can be used for images or data, a removable storage memory can be available for sharing information with other devices, etc. The device typically will include some type of display element 806, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 808, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The device can also include at least one separate gesture component 810, such as an IR sensor or detector, operable to capture information for use in determining gestures or motions of the user, which will enable the user to provide input through the portable device without having to actually contact and/or move the portable device. The device also can include at least one illumination element 812, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 9:
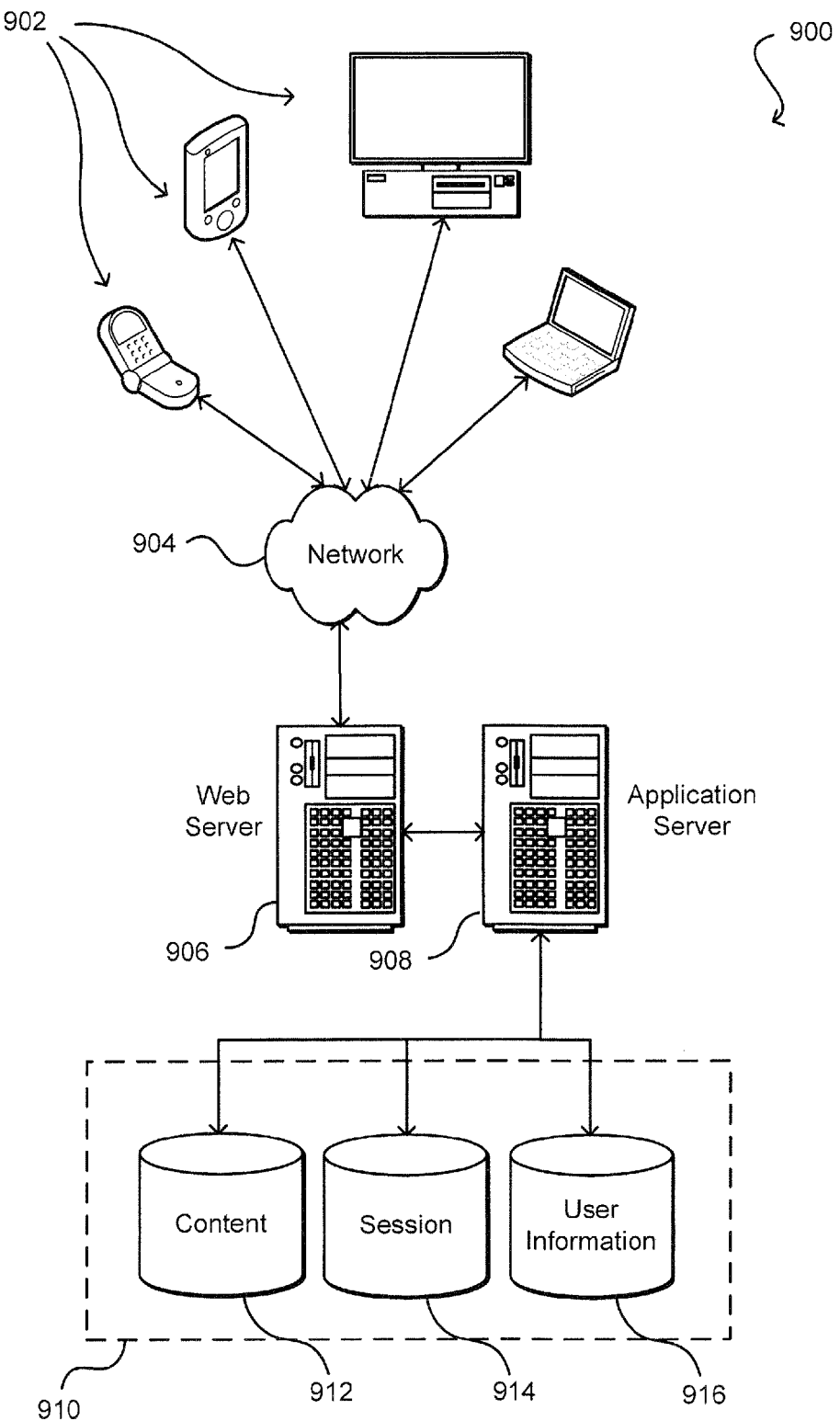
FIG. 9 illustrates an example of an environment for implementing aspects in accordance with various embodiments.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for providing electronic postage, said method comprising:
   under the control of one or more computer systems configured with executable instructions,
   acquiring, using a camera of a portable computing device, an image of a signature located on a package containing an object that is to be shipped from a first geographic location to a second geographic location, the signature being hand-scribbled on the package by a person using a writing instrument;

receiving the image;

performing image recognition to determine whether the captured image of the signature contains sufficient features to be distinct from a plurality of other images stored in a database, and accepting the signature as electronic postage for the package if the captured image is determined to be distinct; and associating the captured image with information indicating at least a recipient address of the second geographic location if the signature is accepted as electronic postage and storing the captured image into the database;

wherein the electronic postage is able to be verified by comparing a subsequently captured image of the signature on the package against the captured image stored in the database in order to determine a recipient address during the shipping of the package from the first geographic location to the second geographic location.

2. The computer implemented method of claim 1, further comprising:

determining the first geographic location of the package based at least in part on a geographical position information obtained from the mobile device; and notifying at least one delivery person that the package is ready to be shipped to the second geographic location in response to accepting the captured image as electronic postage.

3. A computer implemented method, comprising:

under the control of one or more computer systems configured with executable instructions, receiving an image of a user-drawn pattern on a package, the image captured by a camera of a mobile device;

determining whether the user-drawn pattern on the package contained in the captured image is distinct with respect to a plurality of other images stored in at least one database based at least in part on image recognition of the user-drawn pattern on the package contained in the captured image; and accepting the user-drawn pattern as postage for shipping the package based at least in part on determining that the user-drawn pattern on the package contained in the captured image is distinct.

4. The computer implemented method of claim 3, further comprising:

storing the captured image into the at least one database;

associating the captured image with information indicating at least a recipient address of the package, the package requested to be delivered using the postage; and notifying a delivery carrier that the package is ready to be picked up at a location, the location determined based at least in part on the geographical coordinates of the mobile device; and providing the captured image to the delivery carrier.

5. The computer implemented method of claim 4, further comprising:

receiving a second image of the user-drawn pattern, the second image captured using a camera of a second mobile device upon pickup of the package;

performing image recognition to match the user-drawn pattern in the second image to the user-drawn pattern in the captured image stored in the at least one database; and determining at least the recipient address for shipping the package based at least in part on the matching.

6. The computer implemented method of claim 3, wherein determining whether the user-drawn pattern on the package contained in the captured image is distinct further includes:

determining whether a combination of the user-drawn pattern and one or more attributes of the package contained in the captured image is distinct with respect to the plurality of other images in the database.

7. The computer implemented method of claim 3, further comprising:

removing the captured image from the at least one database in response to determining that the package has been delivered to a recipient address.

8. The computer implemented method of claim 3, further comprising:

determining a recipient address for delivering the package based at least in part on an application installed on the mobile device or a contacts list on the mobile device.

9. The computer implemented method of claim 3, wherein determining whether the user-drawn pattern contained in the captured image is distinct further includes:

providing feedback to a user in real time, indicating when the user-drawn pattern reaches a threshold amount of distinguishing features to be determined distinct.

10. A computing device, comprising:

at least one processor; and memory including instructions that, when executed by the processor, cause the computing device to:

receive an image of a scribble rendered by a user onto a package, the image captured by a camera of the computing device;

determine whether the captured image is distinct with respect to a plurality of other images stored in at least one database based at least in part on image recognition of the scribble contained in the captured image; and indicate an acceptance of the scribble as postage for shipping the package based at least in part on determining that the captured image is distinct with respect to the plurality of other images stored in the at least one database.

11. The computing device of claim 10, wherein the memory further includes instructions that cause the computing device to:

transmit the captured image for storage into the at least one database, wherein the captured image is associated with information indicating at least a recipient address of the at least one package, the package requested to be delivered using the postage.

12. The computing device of claim 10, wherein the memory further includes instructions that cause the computing device to:

obtain information indicating at least (a) approximate weight and dimensions of the package, and (b) recipient location for delivering the package; and compute a charge for the postage based at least in part on the information obtained by the computing device.

13. The computing device of claim 10, wherein the captured image contains the arbitrary scribble in combination with one or more attributes of the package.

14. The computing device of claim 10, wherein the memory further includes instructions that cause the computing device to:

determine the recipient address of the second geographic location based at least in part on an application installed on the computing device or a contacts list on the computing device.

15. The computing device of claim 10, wherein the memory further includes instructions that cause the computing device to:
  provide feedback to a user in real time when the scribble reaches a threshold amount of distinguishing features to be distinct with respect to the plurality of other images in the at least one database.

16. A non-transitory computer readable storage medium storing one or more sequences of instructions executable by one or more processors to perform a set of operations comprising:
  receiving an image of an arbitrary scribble, the image captured by a camera of the computing device;
  determining whether the arbitrary scribble contained in the captured image is distinct with respect to a plurality of other images stored in at least one database; and
  accepting the arbitrary scribble as postage for shipping at least one package in response to determining that the arbitrary scribble contained in the captured image is distinct with respect to the plurality of other images stored in the at least one database.

17. The non-transitory computer readable storage medium of claim 16, further comprising instructions for:
  transmitting the captured image for storage into the at least one database, wherein the captured image is associated with information indicating at least a recipient address of the at least one package, the at least one package requested to be delivered using the postage.

18. The non-transitory computer readable storage medium of claim 16, further comprising instructions for:
  obtaining information indicating at least (a) approximate weight and dimensions of the at least one package, and (b) recipient location for delivering the at least one package; and
  computing a charge for the postage based at least in part on the information obtained by the computing device.

19. The non-transitory computer readable storage medium of claim 16, wherein the captured image contains the arbitrary scribble in combination with one or more attributes of the at least one package.

20. The non-transitory computer readable storage medium of claim 16, further comprising instructions for:
  determining the recipient address of the second geographic location based at least in part on an application installed on the computing device or a contacts list on the computing device.

21. The non-transitory computer readable storage medium of claim 16, further comprising instructions for:
  providing feedback to a user in real time when the arbitrary scribble reaches a threshold amount of distinguishing features to be distinct with respect to the plurality of other images in the at least one database.

\* \* \* \* \*